April 24, 1928.

H. D. COLLIER

APPARATUS FOR FORCING LUBRICANT FROM MOTOR
VEHICLE LUBRICANT CONTAINING CASES

Filed March 30, 1925

1,666,992

Inventor
Henry Doward Collier

By Lyon & Lyon Attorneys

Patented Apr. 24, 1928.

1,666,992

UNITED STATES PATENT OFFICE.

HENRY DEWARD COLLIER, OF SAN FRANCISCO, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

APPARATUS FOR FORCING LUBRICANT FROM MOTOR-VEHICLE LUBRICANT-CONTAINING CASES.

Application filed March 30, 1925. Serial No. 19,555.

This invention relates to an apparatus for forcing lubricant from a motor vehicle lubricant containing case, and is more particularly directed to an apparatus for discharging lubricant wherein fluid under pressure is directed against the surfaces of the lubricant within the containing case for causing the same to flow outward into a container.

Lubricants employed in the lubricant holding cases of internal combustion engines are subject to both the deleterious effects of disintegration because of the frictional contact of the moving parts and because of the heat generated by the combustion within the engine, so that, even when most carefully prepared, the lubricant is of comparatively short life and should be frequently changed and the containing case thoroughly cleansed. The disintegration products are for the most part particles of carbon, some of which are suspended within the lubricating fluid and, being so held, are carried by the lubricant into contact with the moving parts which it is sought to lubricate. These particles are extremely hard and their effect, especially on soft metal bearings and the like, is very damaging. Besides the damage that results from the continued use of these lubricants, the lubricant, when the same is diluted with the heavier portions of the fuel used (which leak by the pistons) loses most of its properties of lubrication and becomes practically worthless for the purpose for which it is used. All motor vehicle manufacturers urge frequent changing of the lubricant so as to prolong the life of the engine. Such changing of lubricant, however, has been a tedious and bothersome undertaking which required considerable time, and as most motor vehicle owners do not have the time, or believe that they cannot spare the time to wait for such a lubricant change, their engines are run many miles and for a considerable period of time longer than the lubricant should be used without change.

It is therefore an object of this invention to provide a method of and apparatus for quickly and thoroughly draining the lubricant from a containing case, and which method and apparatus is suited for use in filling stations or like places of gasoline and oil supply, and which is of such a nature as to require a minimum of time, so that lubricant can be drained and new lubricant supplied within an interval of time comparable to that required for filling the fuel supply tank.

Another object of this invention is to provide an apparatus for carrying out the above stated method of lubricant drainage which is inexpensive in operation, upkeep and installation, and which has its parts so associated as to provide an efficient operating mechanism.

Another object of this invention is to provide an apparatus for forcing the lubricant from the lubricant containing case of a motor vehicle engine.

Further objects and advantages of this invention will be apparent from the following detailed description of a preferred embodiment thereof, as illustrated in the accompanying drawings.

Figures 1, 2, 3:
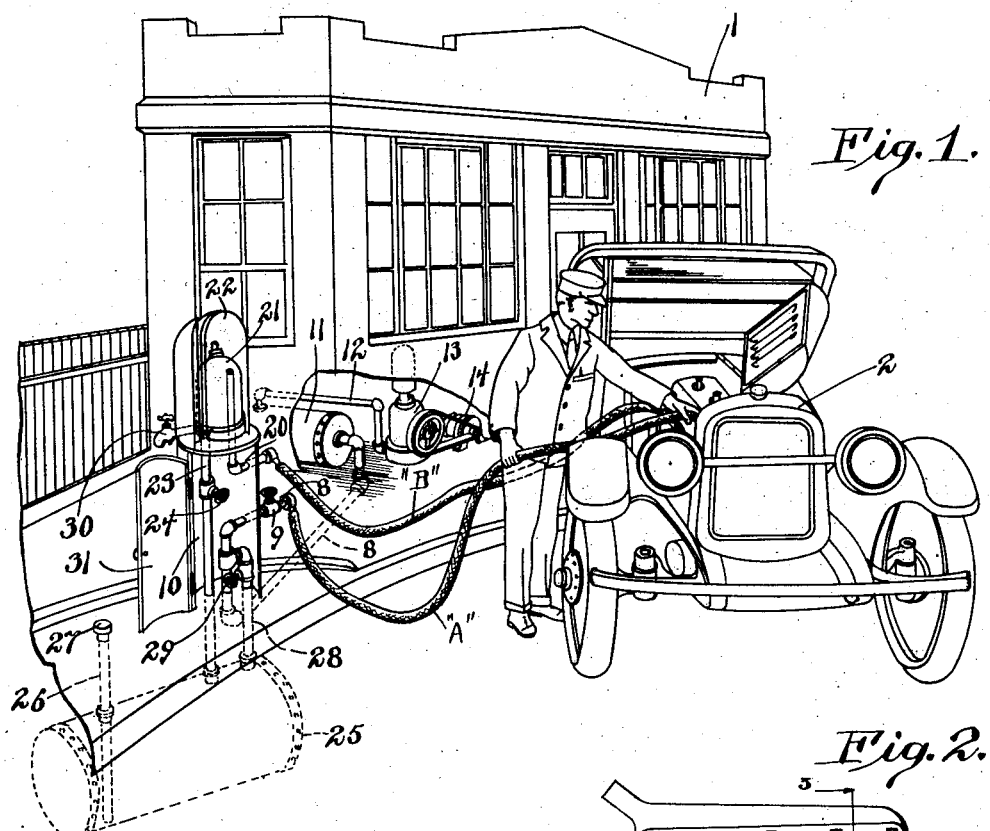
Fig. 1 is a perspective view of a supply station illustrating in perspective a motor vehicle from which the attendant of the station is forcing the lubricant, and showing one portion of the supply station broken away to show a portion of the apparatus embodied in this invention.
Fig. 2 is a side elevation of a motor vehicle engine illustrating the position of the pressure inlet and lubricant discharge conduit embodied in this invention.
Fig. 3 is a sectional end elevation taken substantially on the line 3—3 of Fig. 2.

In the preferred embodiment of this invention shown in the drawings, 1 illustrates a supply station and 2 a motor vehicle from which it is desired to drain the lubricant. A illustrates a flexible pressure hose and B a flexible lubricant discharge hose. The pressure hose A has a nozzle 3 affixed to its end which nozzle 3 is adapted to fit within the lubricant filling pipe 4 normally provided in conjunction with the motor vehicle crank case. The nozzle herein shown consists of a conduit 5, which conduit passes through a bore 6 in a stopper 7, which stopper is tapered to fit within the pipe 4 so as to provide a fluid tight connection. The opposite end of the pressure hose A is connected to a conduit 8 in which conduit a valve 9 is positioned. The conduit 8 is conducted into a standard 10 and passes downward under the ground to a pressure tank 11, preferably situated within the supply station 1. The tank 11 is supplied with air under pressure through a conduit 12 from a compressor 13, which compressor 13 is driven from a motor 14, which compressing unit and storage tank 11 may be the same as that normally found in supply stations for the purpose of providing a supply of air for use in filling pneumatic tires.

The motor 14 is preferably controlled, as is often found in such supply stations, through the medium of the pressure within the tank 11 so that the pressure within the tank 11 is maintained at a certain height. The conduit B is connected at one end by means of a nozzle 15 to the discharge pipe 16, which discharge pipe 16 is connected to a fitting 17 at the lowest point 18 of a lubricant containing case 19. The fitting 17 may be of any desired form to meet conditions of space, etc., as is required for any particular motor vehicle engine. The hose B is connected at its opposite end to a pipe 20 which extends upward to a point near the top of a bell jar 21 which is mounted within a case 22 upon the standard 10.

Communicating with the lowest point of the bell jar 21 is a pipe 23 having a valve 24. and which pipe 23 extends downward and is connected to a storage tank 25 so that when the lubricant is forced from the lubricant containing case 19 by means of pressure exerted thereupon, through the hose B, into the bell jar 21 and has been inspected, the valve 24 may be opened and allowed to drain into the tank 25, which tank 25 is preferably situated below the level of the ground at any convenient point.

A pipe 26 is connected to the tank 25 and extends downward to approximately the lowest point of the tank 25 in one direction, and upwardly above the surface of the ground in the opposite direction, and is provided with a cap 27 which may be removed so as to permit a hose being employed therewith so as to drain the lubricant from the tank 25 when desired. This draining of the lubricant from the tank 25 is obtained by means of pressure supplied from the tank 11 through a conduit 28, in which conduit 28 a valve 29 is positioned; the valve 29 being open, the pressure is communicated through the pipe 8 and the conduit 28 into the tank 25 and forces the lubricant upward through the pipe 26 and through the hose connected with its upper end to any suitable point of delivery.

If it is not desired to drain the lubricant into the tank 25 for any particular reason, the same may be withdrawn from the bell jar 21 through the faucet 30 into any other suitable form of container.

The standard 10 is provided with a door 31 so as to enable easy access to the valves 24 and 29. The conduit 16 is preferably clamped to the motor vehicle case as indicated at 32 and when not in use is provided with a cap 32.

This method, therefore, consists in inserting the nozzle 3 of the hose A in the pipe 4, connecting the hose B with the conduit 16, connecting the hose A with the source of fluid under pressure, (as the tank 11) and permitting the lubricant to flow outward into the bell jar 21, which is for the purpose of observing the condition of the lubricant and to tell the attendant of the station whether the apparatus is operating properly, the bell jar 21 preferably being of glass or of light transparent material. By this means the lubricant is quickly and thoroughly forced from the lubricant containing case 19. If it is then desired to further cleanse the case 19, kerosene or a like cleansing fluid is poured into the case 19 through the pipe 4 and pressure again applied to the surface of this fluid to force the same outward into the bell jar 21. By this means the case is quickly and thoroughly cleansed without inconveniencing the owner or driver of the vehicle, and may be performed while the fuel supply tank of the motor vehicle is being filled, or at any other desired time.

The embodiment of this invention, herein described, is set forth for the purpose of illustrating a practical application of the invention, and it is not intended to limit this invention to the illustrative embodiment but to include all embodiments embraced within the appended claims.

I claim:—

1. In an apparatus for discharging lubricant from a motor vehicle, the combination of a lubricant containing case, a discharge pipe secured to the said case and communicating with the same from below the body of lubricant therein, and extending to a point readily accessible above the point at which the same is secured to the containing case, said pipe being adapted to normally prevent the flow of lubricant from the said case, an inlet communicating with the interior of the said case above the normal level of lubricant within the said case, means for connecting the said inlet with a source of air under pressure, and means for connecting the discharge pipe with a lubricant receiving container.

2. In a system for discharging lubricant from vehicle motors, the combination with the lubricant containing case of the motor vehicles provided with a drain opening located in the bottom of such case, of a discharge pipe secured to the said case communicating with the said opening and extending to a point accessible from above the said opening and normally closing said drain opening to prevent the discharge of lubricant therefrom, an inlet opening above the normal lubricant level in the said case, means in open communication with the said inlet and connected with a source of air under pressure, and means connecting the said drain pipe with a lubricant receiving container.

3. In a filling station accessory, the combination of a pressure hose, means for temporarily establishing a union between one end of the said hose and an inlet in the lubricant case of a motor vehicle, a container, means for temporarily establishing a union between a drainage outlet in the lubricant containing case and the container, and means to produce a relatively higher pressure in the lubricant containing case than in the container.

4. In a system for discharging used lubricant from motor vehicles, the combination with the lubricant containing member of the vehicle motor provided with an opening located in the bottom of such member, of a discharge conduit attached to and carried by the lubricant containing member communicating with said opening and extending permanently to above the high level of lubricant and to a position of ready access, a lubricant discharge tube having means at one end for readily establishing a union between the said discharge tube and the discharge conduit, and means connected with an inlet opening located in the said lubricant container above the lubricant level therein for creating pressure upon the surface of the lubricant within the said member, whereby the said used lubricant may be quickly forced from the vehicle motor.

5. In a system for discharging used lubricant from vehicle motors, the combination with the lubricant containing member of the vehicle motor provided with a drain opening located in the bottom of such member, of a discharge pipe attached to and carried by the said member, communicating with the said opening and extending permanently to above the high level of lubricant and to a position of ready access, a lubricant discharge hose connected at one end with the discharge conduit and at its other end with a container, a pressure hose connected at one end with an inlet in the said containing member above the normal of lubricant level therein and connected at its opposite end with a source of air under pressure, whereby the said lubricant may be quickly forced from the vehicle motor.

Signed at San Francisco, California, this 21st day of March, 1925.

HENRY DEWARD COLLIER.